UNITED STATES PATENT OFFICE.

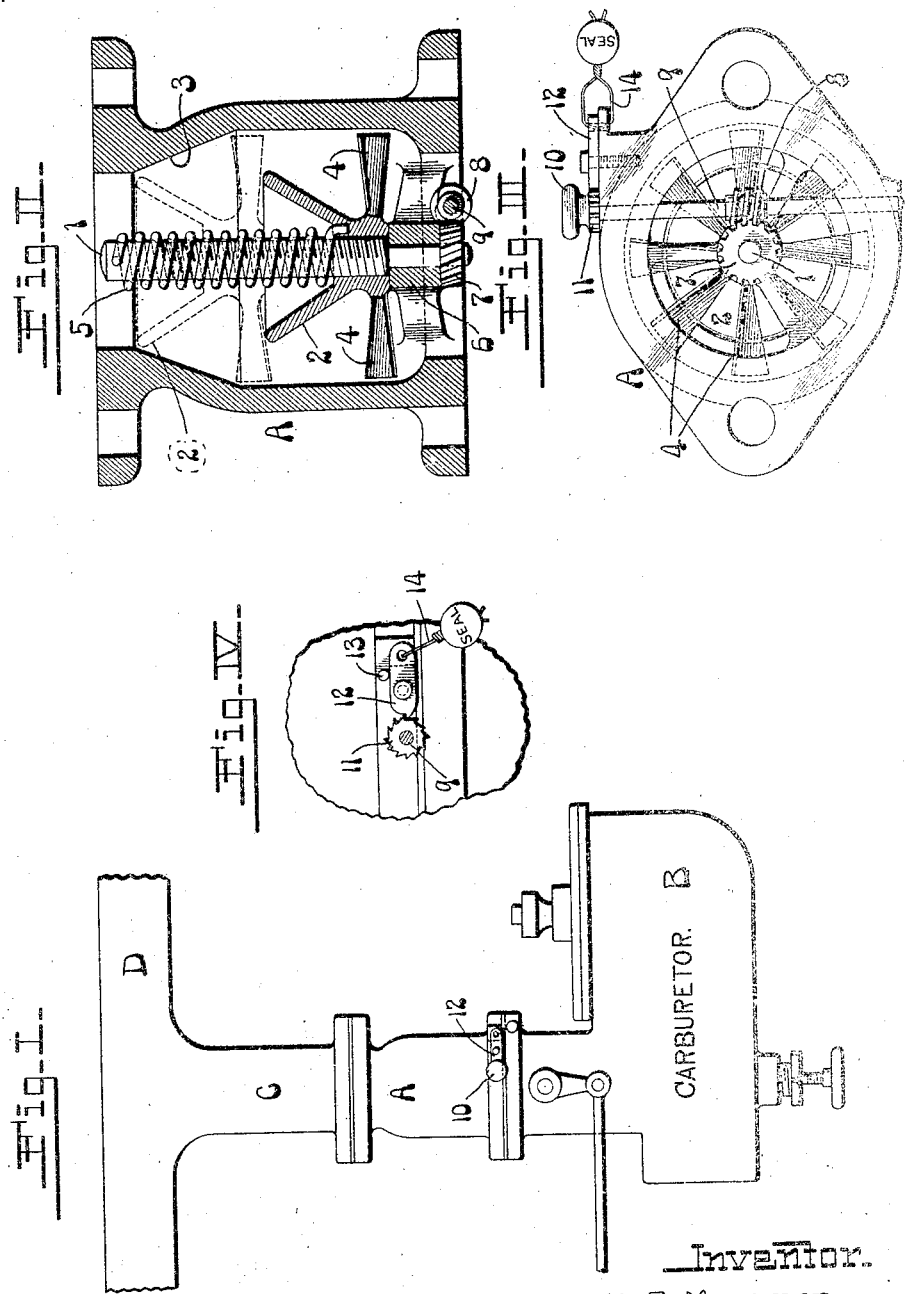

HARRY P. MAMMEN, OF SPRINGFIELD, OHIO.

GOVERNOR FOR INTERNAL-COMBUSTION ENGINES.

1,332,630.

Specification of Letters Patent.

Patented Mar. 2, 1920.

Application filed August 13, 1917. Serial No. 185,930.

*To all whom it may concern:*

Be it known that I, HARRY P. MAMMEN, a citizen of the United States of America, a resident of Springfield, in the county of Clarke, State of Ohio, have invented certain new and useful Improvements in Governors for Internal-Combustion Engines, of which the following is a full, clear, and exact description, reference being had to the accompanying drawings, forming a part of this specification.

My invention relates to improvements in governors particularly adapted for use on internal combustion engines, the main object being to produce a simple and efficient means for regulating the admission of fluid to the engine, thereby limiting the speed of the engine. The governor includes an automatic valve operated by the force due to the velocity of the charge flowing to the engine. The velocity varies in accordance with changes in the speed of the engine pistons, and when the speed reaches a predetermined maximum the automatic valve is actuated to shut off or retard the charge flowing to the engine. As will be hereinafter more fully pointed out, the governor is not necessarily affected by a change in the pressure of the fluid, nor by a change in the volume of fluid; its action depends entirely upon the velocity of the fluid. Therefore, large volumes of the explosive mixture may be admitted to the cylinders, provided the engine does not run faster than the predetermined maximum speed. When the governor is used on a motor vehicle it will regulate the speed of the vehicle, and any desired volume of the explosive mixture may be admitted to the cylinders while the engine is running slower than the maximum speed. This enables the cylinders to receive large volumes of the charge when the vehicle is heavily loaded, or when it is traveling up a hill.

With the foregoing and other objects in view the invention comprises the novel construction, combination and arrangement of parts hereinafter more specifically described and illustrated in the accompanying drawings, wherein is shown the preferred embodiment of the invention; however, it is to be understood that the invention comprehends changes, variations and modifications which come within the scope of the claims hereunto appended.

Figure I is a side elevation showing my governor arranged between a carbureter and the intake pipe of the internal combustion engine.

Fig. II is an enlarged vertical section of the governor.

Fig. III is an inverted plan view of the parts shown in Fig. II.

Fig. IV is a fragmentary detail view illustrating the means for sealing the governor after it has been adjusted.

A designates an upright valve housing arranged between a carbureter B and the intake pipe C of the internal combustion engine, said intake pipe being connected to a manifold D. The mixture passing from the carbureter flows upwardly, through the valve housing A and intake pipe C, to the manifold D.

1 designates a vertical stem arranged within the valve housing and provided with screw threads, as shown in Fig. II. A conical valve 2, mounted in the housing A, may be moved toward and away from a conical wall 3 at the upper portion of the housing. The valve 2 is threaded internally to receive the screw threads on the stem 1, and when said valve moves toward and away from the conical wall 3 it rotates on the stem 1. 4 designates vanes radiating from a hub at the lower end of the valve 2. 5 designates a torsional spring surrounding the stem 1 and secured at its upper end to said stem, the lower end of the spring being secured to the valve 2. The spring 5 is under tension and it tends to retain the valve in engagement with a boss 6 near the lower end of the valve housing, as shown by full lines in Fig. II.

The means for adjusting the spring 5 comprises a worm wheel 7 fixed to the lower end of the stem 1, a worm 8 meshing with said worm wheel, a shaft 9 to which the worm is secured, and an operating knob 10 fixed to the shaft 9. The operating knob 10 is located at the exterior of the valve housing, so it can be conveniently operated for the purpose of rotating the elements just described, thereby varying the tension of the spring 5. A ratchet wheel 11 is fixed to the shaft 9, and a pawl 12 coöperates with said ratchet wheel to lock the spring adjusting device. The pawl 12 normally engages a stop pin 13. The seal shown in Figs. III and IV includes a wire 14 passing through the pawl 12 and also through a lug on the valve housing. After the device has been adjusted the seal is applied to the pawl 12, as shown in the drawings, to prevent an unauthorized person from changing the adjustment. It is, of course, possible for anyone to break the seal and change the adjustment. The owner of the vehicle can adjust the governor for any desired maximum speed, and if the adjustment is changed by the operator or other unauthorized person this will be indicated by the broken seal or by the absence of a seal.

When the engine is in operation the explosive mixture is drawn from the carbureter and through the valve housing A to the intake pipe C. The fluid flowing through the valve housing impinges against the vanes 4, thereby tending to rotate the valve 2 on the threaded stem 1, this tendency being opposed by the spring 5. When the engine pistons move very rapidly, the charge is drawn through the valve chamber at a high velocity, and when the force due to the velocity is greater than the force of the spring 5, the vanes 4 will revolve so as to advance the valve 2 toward the conical wall 3, thus retarding the explosive mixture.

It is important to note that the automatic action of the valve is due to the velocity, and not to the volume or pressure of the charge. When the motor vehicle is heavily loaded, or when it is moving up a hill, the throttle may be opened to obtain the desired power without actuating the automatic valve. The velocity of the charge depends primarily upon the speed of the pistons, and since the action of the valve is due to the velocity it will be apparent that the new device will regulate the speed of the engine.

The vanes 4 do not revolve freely, they are practically stationary most of the time. The mixture, passing the vanes, is therefore whirled in the valve chamber A, the result being a better mixture and a higher degree of efficiency. Centrifugal force causes the liquid portions of the whirling mixture to strike the wall of the valve chamber, and this liquid (gasolene) is permitted to return by gravity to the carbureter.

I claim:

1. In an engine governor, a conductor through which fluid is delivered to the engine, and an automatic valve device whereby the rate of flow of the fluid is limited so as to limit the speed of the engine, said automatic valve device comprising a valve arranged in said conductor, and a screw having threads to which said valve is rotatably fitted, said valve being adapted to rotate and advance along the screw to retard the flow of fluid, and said valve being actuated by the force due to the velocity of the fluid.

2. In an engine governor, a conductor through which fluid is delivered to the engine, and an automatic valve device whereby the rate of flow of the fluid is limited so as to limit the speed of the engine, said automatic valve device comprising a valve arranged in said conductor, a screw having threads to which said valve is rotatably fitted, said valve being adapted to rotate and advance along the screw to retard the flow of fluid, and vanes carried by said valve, said valve and vanes being actuated by the force due to the velocity of the fluid impinging against said vanes.

3. In an engine governor, a conductor through which fluid is delivered to the engine, and an automatic valve device whereby the rate of flow of the fluid is limited so as to limit the speed of the engine, said automatic valve device comprising a valve arranged in said conductor, a screw having threads to which said valve is rotatably fitted, said valve being adapted to rotate and advance along the screw to retard the flow of fluid, vanes carried by said valve, said valve and vanes being actuated by the force due to the velocity of the fluid impinging against said vanes, and a spring tending to prevent said valve from rotating on the screw.

4. In an engine governor, a conductor through which fluid is delivered to the engine, and an automatic valve device whereby the rate of flow of the fluid is limited so as to limit the speed of the engine, said automatic valve device comprising a valve arranged in said conductor, a screw having threads to which said valve is rotatably fitted, said valve being adapted to rotate and advance along the screw to retard the flow of fluid, vanes carried by said valve, said valve and vanes being actuated by the force due to the velocity of the fluid impinging against said vanes, and a torsional spring surrounding said screw and connecting the valve to the screw, said torsional spring tending to prevent the valve from rotating on the screw.

5. In an engine governor, a conductor through which fluid is delivered to the engine, and an automatic valve device whereby the rate of flow of the fluid is limited so as to limit the speed of the engine, said automatic valve device comprising a valve arranged in said conductor, a screw having threads to which said valve is rotatably fitted, said valve being adapted to rotate and advance along the screw to retard the flow of fluid, vanes carried by said valve, said valve and vanes being actuated by the force due to the velocity of the fluid impinging against said vanes, a torsional spring surrounding said screw and connecting the valve to the screw, said torsional spring tending to prevent the valve from rotating on the screw, a worm wheel fixed to said screw, a worm meshing with said wheel, a shaft secured to said worm, an operating member on said shaft, a ratchet wheel secured to said shaft, and a pawl fitted to said ratchet wheel.

In testimony that I claim the foregoing I hereunto affix my signature.

HARRY P. MAMMEN.